United States Patent
Feher

(10) Patent No.: US 7,998,249 B2
(45) Date of Patent: Aug. 16, 2011

(54) INLET AIR CHILLING AND FILTRATION SYSTEMS AND METHODS FOR A GAS TURBINE

(75) Inventor: Peter Feher, Suwanee, GA (US)

(73) Assignee: General Electric Company, Schenectady, NY (US)

( * ) Notice: Subject to any disclaimer, the term of this patent is extended or adjusted under 35 U.S.C. 154(b) by 1087 days.

(21) Appl. No.: 11/552,536

(22) Filed: Oct. 25, 2006

(65) Prior Publication Data

US 2008/0098890 A1 May 1, 2008

(51) Int. Cl.
*B01D 47/00* (2006.01)

(52) U.S. Cl. ............... 95/187; 95/224; 96/265; 96/273; 96/322; 96/356

(58) Field of Classification Search ............ 95/214–217, 95/224; 96/296–300, 356–371
See application file for complete search history.

(56) References Cited

U.S. PATENT DOCUMENTS

| | | | | |
|---|---|---|---|---|
| 2,410,215 A * | 10/1946 | Houghton | ...................... | 239/515 |
| 2,603,141 A * | 7/1952 | Phillips et al. | ................. | 454/310 |
| 3,333,835 A * | 8/1967 | De Flon | ........................ | 261/111 |
| 3,445,093 A * | 5/1969 | Reder | .............................. | 261/24 |
| 3,472,001 A * | 10/1969 | McMakin | ....................... | 96/294 |
| 3,498,590 A * | 3/1970 | Furlong | ......................... | 261/111 |
| 3,807,145 A * | 4/1974 | Engalitcheff et al. | ........... | 96/357 |
| 4,002,441 A * | 1/1977 | Johnson | ......................... | 96/257 |
| 4,052,491 A * | 10/1977 | Lefevre | ...................... | 261/112.2 |
| 4,251,242 A * | 2/1981 | Ito | .................................... | 96/232 |
| 4,397,793 A * | 8/1983 | Stillman et al. | ................. | 261/30 |
| 4,552,303 A * | 11/1985 | Fisher et al. | ................. | 236/44 C |
| 4,788,013 A * | 11/1988 | Kinney et al. | ................... | 261/24 |
| 4,926,620 A * | 5/1990 | Donle | ............................. | 95/202 |
| 5,116,499 A * | 5/1992 | Deibel | .......................... | 210/232 |
| 5,338,256 A * | 8/1994 | Tonna | ........................... | 454/310 |
| 5,662,721 A * | 9/1997 | Bresowar | ........................ | 96/356 |
| 6,946,021 B2 * | 9/2005 | Aoyagi | .......................... | 96/226 |
| 7,527,674 B1 * | 5/2009 | Janawitz et al. | ................. | 96/57 |
| 2001/0054354 A1 * | 12/2001 | Baudat et al. | ................... | 95/214 |
| 2002/0083712 A1 * | 7/2002 | Tomlinson et al. | ............. | 60/775 |
| 2006/0255483 A1 * | 11/2006 | Mockry et al. | ................ | 261/109 |

* cited by examiner

*Primary Examiner* — Duane Smith
*Assistant Examiner* — Ives Wu
(74) *Attorney, Agent, or Firm* — Sutherland Asbil & Brennan LLP

(57) ABSTRACT

An inlet air chilling and filtration system for a turbine. The inlet air chilling and filtration system may include a first stage spray array with a first number of spray nozzle pairs, a second stage spray array with a second number of spray nozzles pairs, and a drift eliminator.

17 Claims, 2 Drawing Sheets

INLET AIR CHILLING AND FILTRATION SYSTEMS AND METHODS FOR A GAS TURBINE

TECHNICAL FIELD

The present application relates generally to gas turbine engines and more particularly relates to inlet air chilling and filtration systems and methods for a gas turbine engine.

BACKGROUND OF THE INVENTION

Air entering a turbine compressor and similar devices should be treated before compression or other use. Air treatment includes removing solid or liquid particulates from the air, cooling or heating the air to the optimum temperature, and minimizing the pressure loss of the air during this process.

Impure air laden with dust particles, salt, and other contaminants may damage the compressor blades and other types of power plant equipment via corrosion and erosion. Such damage may reduce the life expectancy and the performance of the equipment. To avoid this problem, the turbine inlet air generally passes through a series of air filters to remove the contaminants. Known air filters generally are located at an elevated height so as to minimize the entry of ground contaminants. These known filtration systems, however, are generally complicated and costly.

The performance of a turbine is very sensitive to the inlet air temperature. At higher temperatures, the power output of the turbine is significantly lower due to lower air density and mass flow. High ambient temperature also is detrimental to efficiency while too low a temperature may cause icing and compressor damage.

Pressure loss of the inlet air reduces the power output and the efficiency of the gas turbine. Minimizing the pressure loss of the inlet air, however, is very difficult and costly. Conventional inlet air filters generally have limitations on the maximum air velocity so as to maintain filtration and limit the pressure loss of the inlet air. Known air filters also may be clogged by environmental conditions such as rain and snow. Such clogging may reduce filtration and cooling efficiency while increasing the overall pressure drop.

Thus, there is a desire for an improved turbine inlet air system. Such an improved system preferably would provide adequate filtering while chilling the intake temperature of the air with limited or no pressure loss. Specifically, such a system would increase the output of the turbine system as a whole and increase overall efficiency.

SUMMARY OF THE INVENTION

The present application thus describes an inlet air chilling and filtration system for a turbine. The inlet air chilling and filtration system may include a first stage spray array with a first number of spray nozzle pairs, a second stage spray array with a second number of spray nozzles pairs, and a drift eliminator. Multiple stages may be used.

The present application further describes a method of chilling and filtering inlet air for a turbine. The method may include flowing the inlet air through a first stage water spray having a first temperature and flowing the inlet air through a second stage water spray having a second temperature such that the second temperature is lower than the first temperature.

The present application further provides an inlet air chilling and filtration system for a turbine. The inlet air chilling and filtration system may include a first stage spray array with a first number of spray nozzle pairs, a second stage spray array with a second number of spray nozzle pairs, and a water recirculation system. The spray nozzle pairs may include an inverted double cone spay pattern. The water recirculation system may include a water chiller.

These and other features of the present application will become apparent to one of ordinary skill in the art upon review of the following detailed description when taken in conjunction with the several drawings and the appended claims.

DETAILED DESCRIPTION

Figure 1:
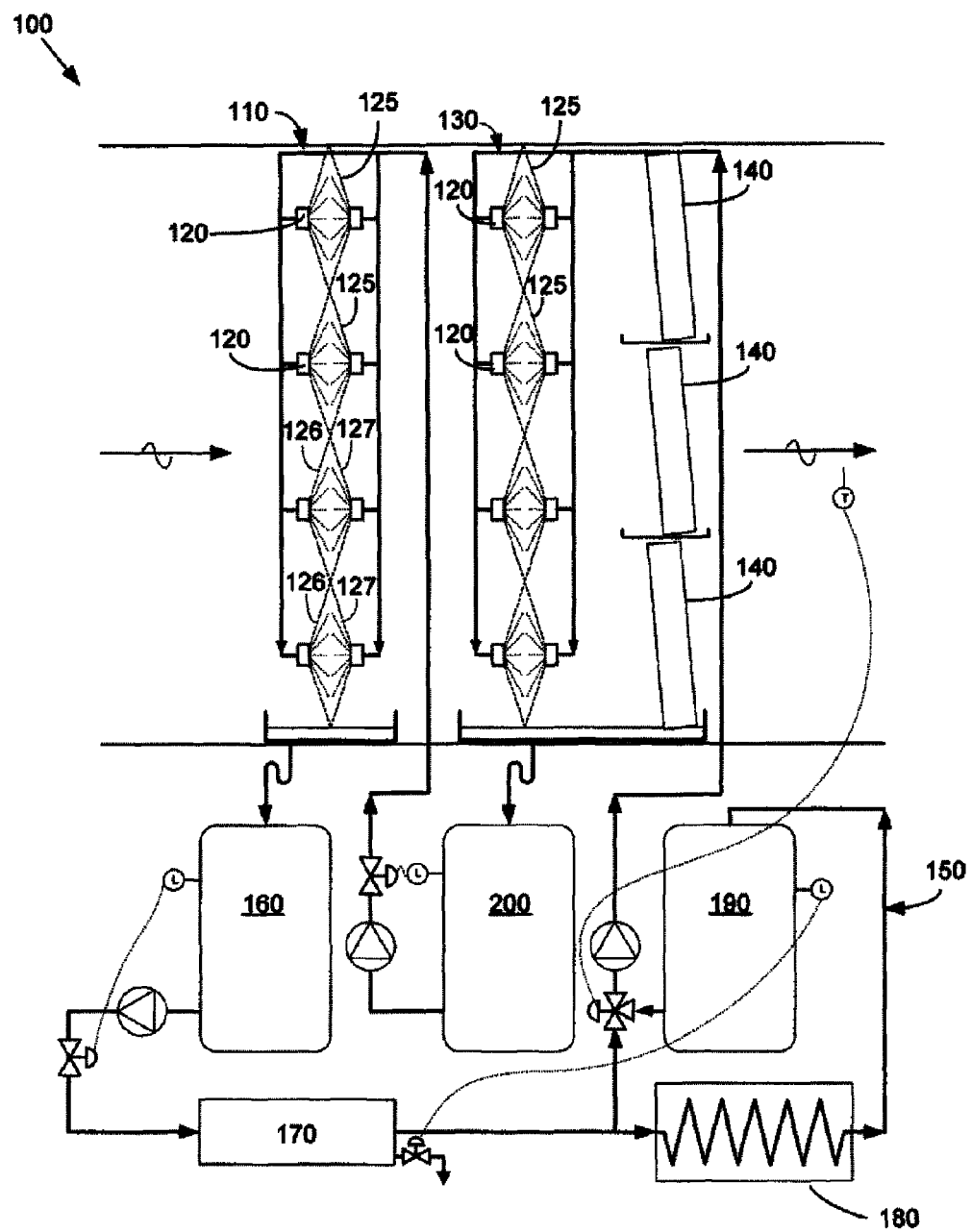
FIG. 1 is a schematic view of the inlet air chilling and filtration system as is described herein.

Referring now to the drawings, in which like numerals indicate like elements throughout the several views, FIG. 1 shows a schematic view of an inlet air chilling and filtration system 100 as is described herein. As described above, the inlet air chilling and filtration system 100 may be positioned upstream of a compressor or other type of turbine component. Several inlet air chilling and filtration systems 100 may be used.

The system 100 includes a first stage spray array 110. The first stage spray array 110 includes a number of spray nozzle pairs 120. The spray nozzle pairs 120 may be of conventional design. Any number of spray nozzle pairs 120 may be used herein. Each spray nozzle pair 120 creates a spray pattern 125 in the form of inverted double cones. The spray patterns 125 may include a first spray cone 126 that is directed in line with the air flow and a second spray cone 127 that may be directed against the air flow. The spray patterns 125 may be largely equivalent in shape. Other type of spray patterns 125 may be used herein. In aggregate, the spray patterns 125 create a water curtain effect.

The inlet air chilling and filtration system 100 also may include a second stage spray array 130. The second stage spray array 130 also may include a number of spray nozzle pairs 120 as is described above. Any number of spray nozzle pairs 120 also may be used herein. The spray nozzle pairs 120 may provide the inverted double cone spray pattern 125 or any desired spray pattern. Further spray arrays also may be used herein in additional stages or otherwise.

A number of drift eliminators 140 may be positioned downstream of the spray arrays 110, 130. The drift eliminators 140 prevent water carryover into the compressor and/or other types of turbine equipment. The drift eliminators 140 may be of conventional design. Any number of drift eliminators 140 may be used. Further, the airflow path also may be a convoluted path by using baffles and bend (not shown) so as to prevent water carryover into the compressor or other types of equipment.

The inlet air chilling filtration system 100 may include a water recirculation system 150. The water used in the first stage spray array 110 may be collected and maintained in a return water well 160. The water from the return water well 160 may be treated to remove contaminants therein in a water treatment apparatus 170. The water treatment apparatus 170 may be of conventional design. Once treated, the water may be sent to a chiller 180 or otherwise re-circulated. The chiller 180 may be of conventional design. The chilled water then may be pumped into a chilled water well 190. The chilled water then may be pumped or otherwise forwarded to the second stage spray array 130. The water from the second spray array 130 also may be collected in a warm water well 200. The water from the warm water well 200 may then be pumped or otherwise forwarded to the first stage spray array 110 so as to repeat the process. By using the chilled water in the second stage spray array 130 first, the temperature of the air through the spray arrays 110, 130 gets progressively colder.

In use, the spray arrays 110, 130 of the inlet air chilling and filtration system 100 use the chilled water as the chilling and filtration medium in direct contact with the inlet air. Specifically, the water flow through the first and second spray arrays 110, 130 provides a counter flow stream to the inlet airflow therethrough. Each stage of the spray arrays 110, 130 creates a continuous chilled water spray curtain. The chilled water lowers the air temperature of the inlet air therethrough while capturing and/or dissolving dust salt, and other contaminants. The use of the chilled water thus increases air density as well as the air mass and the flow rate entering the combustor or otherwise. Such an increase provides higher power output with an increased overall thermal efficiency. The system 100 also may reduce the humidity of the air in the form of condensation in all but the most extremely dry ambient conditions.

The system 100 thus may reduce the temperature of the incoming ambient air from, for example, about 95 degrees Fahrenheit to about 50 or 45 degrees Fahrenheit (about 35 degrees Celsius to about 10 or 7 degrees Celsius) or less. Further reductions may be possible. As a result, the system 100 may provide reliable power output and efficiency increase regardless of ambient conditions. By combining air filtration and chilling, the system 100 may reduce overall direct material and labor costs in that the equipment is smaller and requires only a single access area for maintenance. Installation cycle time also should be reduced. Likewise, the ongoing maintenance of the system 100 as a whole as compared to known devices should be reduced.

Figure 2:
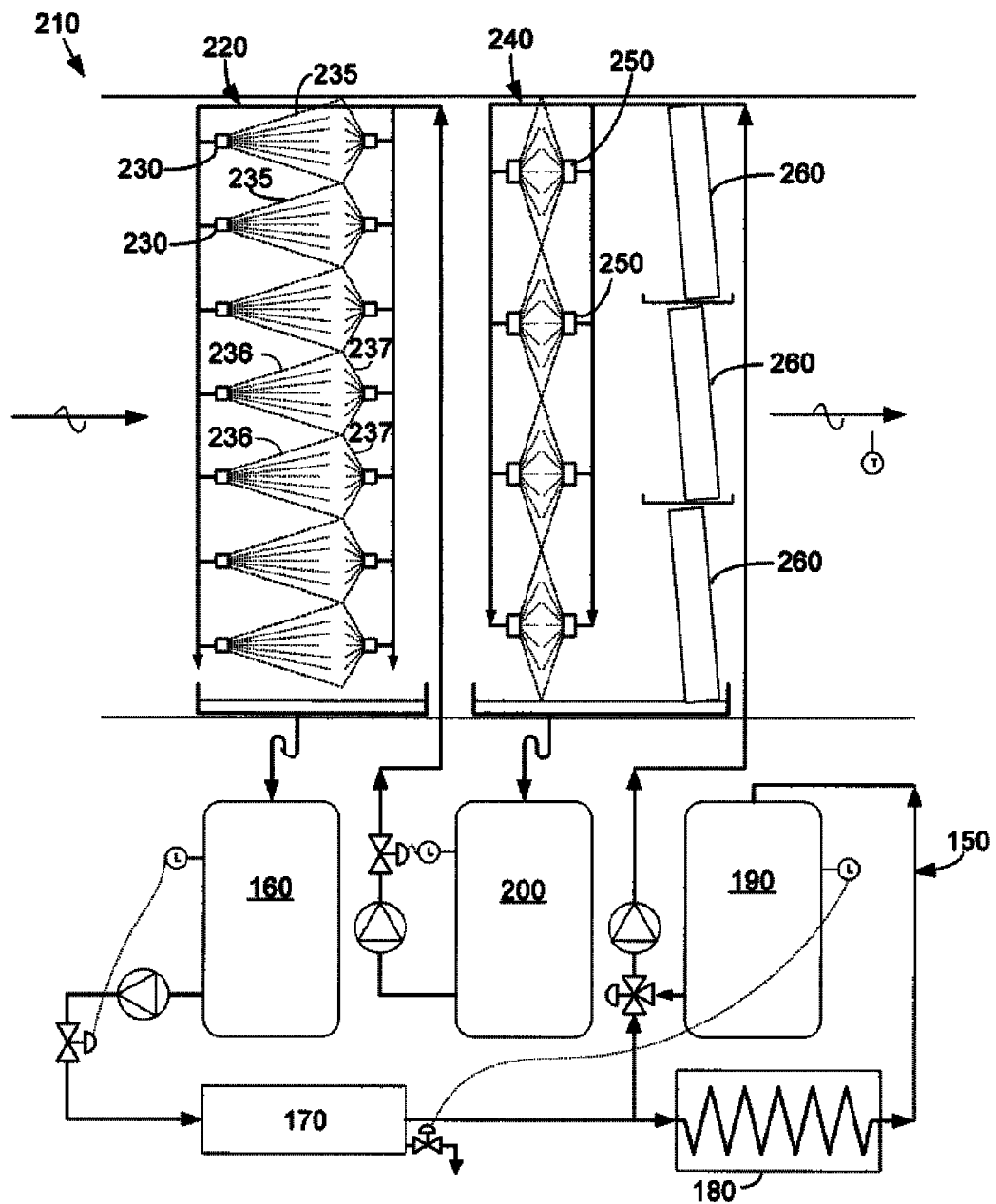
FIG. 2 is an alternative embodiment of the inlet air chilling and filtration system.

FIG. 2 shows a further embodiment of an air inlet chilling and filtration system, an air charger configuration 210. In this embodiment, a first stage spray array 220 has a number of spray nozzle pairs 230. Any number of nozzles pairs 230 may be used herein. As is shown, the spray nozzle pairs 230 create a spray configuration 235 in the form of a low cone angle 236 on first side and a high cone angle 237 on the other. The first set of cones (in-line with the air flow) acts as a jet amplifier. The first low cone angle shown has higher water pressures and velocities as compared to the high cone angles. This low cone angle configuration thus increases the pressure of the inlet air by a venturi effect. Other spray configurations may be used herein. The increase of the pressure (or the air charge or boosting effect) depends on the type and number of the nozzle pairs 230. The inlet pressure may be raised by a few inches of $H_2O$ of air, for example, from about 0.5 to about 2.5 inches of $H_2O$, so as to act as an air-charging device.

The air charge configuration 210 also includes a second stage spray array 240 with a number of spray pairs 250 and a number of drift eliminators 260 downstream of the second stage spray array 240. A number of drift eliminators 260 also may be used immediately downstream of the first stage spray array 220 so as to capture the water therefrom. The air charge configuration 210 also may include the water recirculation system 150 as is described above.

It should be apparent to one of ordinary skill in that art that the foregoing relates only to the preferred embodiments of the present invention and that numerous changes and modifications may be made herein without departing from the general spirit and scope of the invention as defined by the following claims and the equivalents thereof.

I claim:

1. An inlet air chilling and filtration system for a turbine, comprising:
   a first stage spray array;
   the first stage spray array comprising a first plurality of spray nozzle pairs;
   a second stage spray array;
   the second stage spray array comprising a second plurality of spray nozzles pairs; and
   a water recirculation system;
   the water recirculation system comprises a water chiller; and
   wherein the water chiller is in communication with the second stage spray array such that a flow of water recirculates from the water chiller to the spray arrays and back to the water chiller.

2. The inlet air chilling and filtration system of claim 1, wherein the first and the second plurality of spray nozzle pairs comprise an inverted double cone spray pattern.

3. The inlet air chilling and filtration system of claim 2, wherein the inverted double cone spray pattern comprises a pair of equivalent cones with a first spray cone in line with the inlet air and a second spray cone directed against the inlet air.

4. The inlet air chilling and filtration system of claim 2, wherein the inverted double cone spray pattern comprises a cone with a first angle and a cone with a second angle and wherein first angle is larger than the second angle.

5. The inlet air chilling and filtration system of claim wherein the water recirculation system comprises a water treatment apparatus.

6. The inlet air chilling and filtration system of claim 1, further comprising a plurality of stage spray arrays.

7. A method of chilling and filtering inlet air for a turbine, comprising:
   flowing the inlet air through a first stage water spray;
   wherein first stage water spray comprises a first temperature;
   flowing the inlet air through a second stage water spray;
   wherein second stage water spray comprises a second temperature;
   wherein the second temperature is lower than the first temperature; and
   recirculating a flow of water through the water sprays to a chiller and back to the water sprays.

8. The method of claim 7, wherein the step of flowing the inlet air through the first stage water spray comprises spraying an inverted double cone spray pattern.

9. The method of claim 8, wherein the inverted double cone spray pattern comprises spraying a pair of equivalent cones with a first spray cone and a second spray cone.

10. The method of claim 8, wherein the inverted double cone spray pattern comprises spraying a cone with a first angle and a cone with a second angle and wherein first angle is larger than the second angle.

11. The method of claim 9, wherein the step of flowing the inlet air through the first spray cone comprises flowing a stream of water in the direction of the inlet air and wherein the step of flowing the inlet air through the second spray cone comprises flowing a stream of water against the direction of the inlet air.

12. The method of claim 7, wherein the step of flowing the inlet air through the second stage water spray comprises spraying an inverted double cone spray pattern.

13. The method of claim 7, further comprising the step of re-circulating the water used in the first stage water spray and the second stage water spray.

14. The method of claim 13, further comprising the step of chilling the re-circulated water.

15. The method of claim 14, wherein the chilled water is used first in the second stage water spray.

16. The method of claim 7, further comprising a plurality of steps of flowing the inlet air through a plurality of stage water sprays.

17. An inlet air chilling and filtration system for a turbine, comprising:
   a first stage spray array;
   the first stage spray array comprising a first plurality of spray nozzle pairs;
   a second stage spray array;
   the second stage spray array comprising a second plurality of spray nozzles pairs;
   the first and the second plurality of spray nozzle pairs comprising a cone with a first angle and a cone with a second angle and wherein first angle is larger than the second angle; and
   a water recirculation system.

* * * * *